Figure 3:
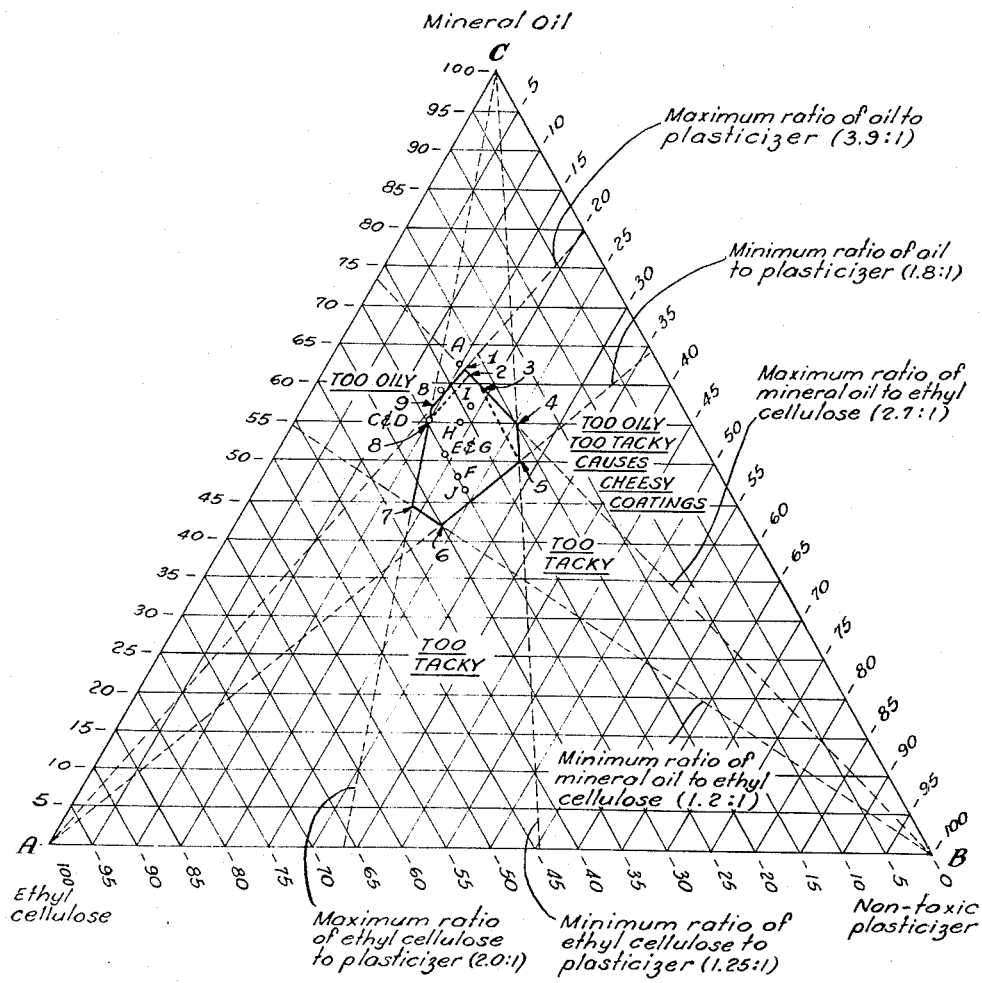

Sept. 6, 1960 H. C. KELLY ET AL 2,951,763
COMPOSITION AND PROCESS FOR COATING FOODSTUFFS
AND ARTICLES THEREBY OBTAINED
Filed June 9, 1958 2 Sheets-Sheet 1

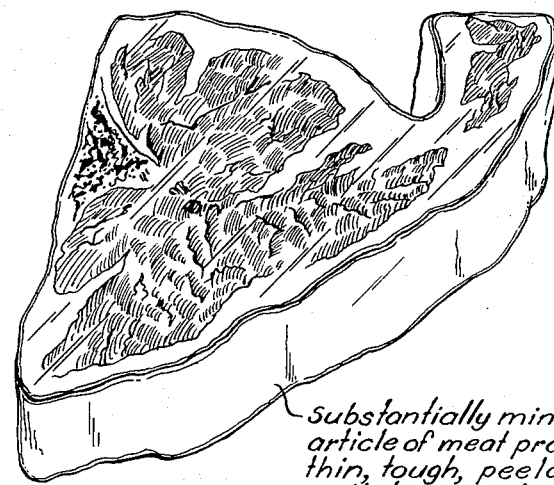

*Fig. 1*

Substantially mineral oil-free article of meat provided with thin, tough, peelable ethyl cellulose-containing coating comprising mineral oil in its composition.

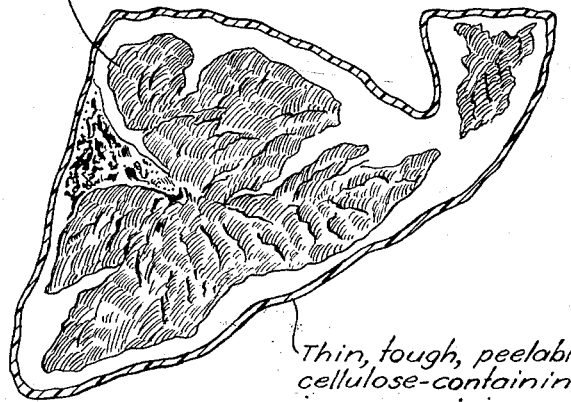

Meat substantially free of mineral oil on its coated surface

*Fig. 2*

Thin, tough, peelable ethyl cellulose-containing coating comprising mineral oil in its composition INVENTORS.
Harold C. Kelly
James R. Wirt
BY Jerome Rudy
ATTORNEY INVENTORS.
Harold C. Kelly
James R. Wirt
BY Jerome Rudy
ATTORNEY United States Patent Office 2,951,763
Patented Sept. 6, 1960

2,951,763
COMPOSITION AND PROCESS FOR COATING FOODSTUFFS AND ARTICLES THEREBY OBTAINED

Harold C. Keily and James R. Wirt, Midland, Mich., assignors to The Dow Chemical Company, Midland, Mich., a corporation of Delaware Filed June 9, 1958, Ser. No. 740,800

8 Claims. (Cl. 99—169)

This invention relates to coating compositions comprising oleaginous mixtures of cellulose ethers which are especially suited for enveloping certain articles of food, particularly meat and meat products, in tightly-adhering, protective coatings which may be readily stripped or peeled from the article and which are advantageously adapted to avoid deposition of intolerable or undesirable quantities of oleaginous residues on the coated article. More particularly, it is concerned with such coating compositions that are applied from, or while they are in, the molten condition. In order to avoid sesquipedal and cumbrous expressions, compositions of the indicated nature are frequently referred to as "hot melts." Pursuant to such terminology, they are characterized by such term throughout the following description and specification. The present invention also has reference to a process for coating food articles with the referred-to compositions and to exceptionally utile coated articles thereby obtained.

The present application is a continuation-in-part of copending application Serial No. 560,608, filed January 23, 1956, now United States Letters Patent No. 2,840,474. It is also a continuation-in-part of copending application Serial No. 681,099, filed August 29, 1957, now United States Letters Patent No. 2,840,476, which application was a continuation-in-part of now abandoned application Serial No. 554,449, filed December 21, 1955.

In the handling and merchandising of many foodstuffs, especially those intended for distribution at the retail level, and particularly meat and meat products, it is desirable for important reasons of economy and efficiency to operate with use of central processing installations. Thus, as in the distribution of meat and meat products, it is a significant advantage to distribute the product to market in vendable packaged form from centralized cutting and packaging plants. This, as is apparent, permits reduction in waste, more efficacious use of labor, neater and more readily controllable production practices as well as securing many other benefits.

In conjunction with such schemes, many foodstuffs are prepared and handled in frozen form. Meat and the like foodstuffs may also be prepared and handled by freezing. However, particularly in the case of meat products, the lack of adequate and generally satisfactory packaging for the purpose has tended to retard the more extensive development and greater exploitation of arrangements for merchandizing many foodstuffs in frozen form after their preparation in central processing plants.

For example, many of the packaging materials available for frozen meat are either opaque or non-translucent (such as wax or paperboard) or, at best, slightly hazy (such as polyethylene and certain other polymer films). Furthermore, many packaging materials fail to provide skin-tight contact of the coating or wrapper over and upon the coated article. Due to this deficiency, they may permit air pockets to be present in the package wherein ice may collect after its formation from the moisture in the coated article. In addition, many packaging materials tend to be brittle and easily broken at freezing temperatures so as to possibly occasion the dehydration of the foodstuff in a damaged package.

A relative broad range of certain types of ethyl cellulose hot melt compositions are well adapted to provide transparent, enveloping coverings of a readily strippable nature over many foodstuffs, including those in frozen condition and particularly meat and the like. Such coatings and the coated articles thereby obtained are much better in many respects than the conventional varieties of packaging materials for foodstuffs. These compositions, however, are not generally without certain drawbacks and limitations.

Thus, the physical properties of coatings from many ethyl cellulose hot melts comprised of mineral oil components are such that relatively large coating thicknesses are required to ensure satisfactory performance of the applied coating. This, of course, is uneconomical, since the cost of coatings from ethyl cellulose hot melts that are more than about 25 mils thick is sufficiently high to place them under some price disadvantage with competitive packaging materials. It is usually desirable for reasons of economy for the coating thickness applied from the hot melt to be less than about 25 mils and, preferably, on the order of 10 mils or so. Not all hot melts are capable of providing satisfactory coatings for food packaging purposes when applied in such relatively thin layers. Furthermore, the coatings from many ethyl cellulose hot melt compositions tend to undergo highly objectionable crazing phenomena, detrimental to their desired transparency, especially under the influence of low temperatures. This is particularly noticeable with meat products whereupon the coating may develop many white flecks resulting at least in part from the interaction between the meat fat and the coating. In addition, a great number of the mineral oil-containing ethyl cellulose hot melts furnish coatings that tend to exude undesirable and even intolerable quantities of oil on the surface of the article of food that is covered with the coating. While the migration of mineral oil to the coated foodstuff, such as meat, is perfectly safe from a strictly toxicological point of view, it is highly objectionable for aesthetic and practical reasons and may serve to severely restrict or even entirely destroy the general acceptability and marketability of the coated product.

In this connection, it is undesirable for the migration of mineral oil from a mineral oil-containing ethyl cellulose hot melt coating to be so great as to cause the surface of the coated foodstuff to assimilate more than about 200 parts per million by weight (p.p.m.) of the oil, as based on an article having a weight of about two pounds. Such assimilation, as is apparent, occurs during the hot melt application and storage of the coated foodstuff. In frozen articles, especially in frozen meat and the like and particularly when application of the hot melt is made to an already frozen foodstuff, severe oil migration may occur during the thawing of an unstripped article. It is generally most advantageous for oil pick up to be such that less than about 150 p.p.m. of mineral oil residue is assimilated by and remains upon the coated article of food. It is most desirable for the coating to have such a minimized propensity to exude oil that the coated article of food, particularly when it is a meat or the like product, picks up only 25-35 or less p.p.m. of oil even under the most severe migration-favoring conditions, such as during thawing for prolonged periods of frozen packages, and based, as indicated, upon about a two pound piece of the coated foodstuff, such as meat.

It would be advantageous to provide certain articles of food, particularly meat and meat products, with tough, economically thin, closely conforming coatings from oleaginous ethyl cellulose hot melts which coatings have protective and preservative value and which could be readily removed by clean and efficient stripping or peeling operations. It would be particularly advantageous if such coatings had absolutely minimized tendency under any conditions of service to exude oil on the coated article of food. It would be additionally beneficial for such coatings to be imbued with other desirable characteristics, including flexibility at temperatures which are commonly encountered in refrigerators and food freezers; attractive appearance and, quite commonly, a desirably dry feel upon handling (being free from repulsive characteristics in this regard); relatively high impermeability to gases and water and other common vapors to minimize or prevent the occurrence of intolerable oxidation, dehydration or contamination in the coated foodstuff; and, as a primary requirement, absolute non-toxicity, i.e., freedom from any tendency to transfer deleterious or harmful materials to the foodstuff. It would be of even greater advantage and desirability if the coatings would be available in a relatively transparent and pellucid condition, or in a condition in which they were at least free from excessive opacity, in order to permit ready and reliable visual inspection of the coated article. It would be an exceptional advantage and a pronounced benefit for such coatings to be obtainable from readily available and inexpensive materials and to be efficaciously utilizable in a convenient and economical manner.

These desiderations and many other advantages and benefits which hereinafter are manifest may be realized with and achieved by coating compositions that are in accordance with the present invention which are basically comprised of a mixture that essentially consists of between about 20 and 38 percent by weight of ethyl cellulose; between about 42 and 61 percent by weight of a refined mineral oil; between about 14 and 28 percent by weight of a non-toxic plasticizer which is a solvent for the cellulose ether wherein, within the specified limits, the weight ratio of the ethyl cellulose to the plasticizer is between about 1.25:1 and 2.0:1, respectively, the weight ratio of the mineral oil to the ethyl cellulose is between about 1.2:1 and 2.7:1, respectively, and the weight ratio of the mineral oil to plasticizer is between about 1.8:1 and 3.9:1, respectively; the essential constitution of such composition falling within the area enclosed and defined by the lines connecting points 1–4–5–6–7–9–1 in the ternary composition diagram set forth in the graph of Figure 3 of the accompanying drawing (which illustrates the constitutional characteristics of the compositions of the present invention); said composition having a viscosity taken at about 320° F. that is between about 500 and 10,000 centipoises and, preferably, between about 600 and 5,000 centipoises (in order to more easily avoid any problems with bubble formation due to the application of thicker formulations).

Advantageously, compositions that are in accordance with the present invention may also be prepared so as to contain up to about 10 percent by weight, based on the weight of the composition, of an acid-accepting, epoxidized long chain fatty acid triglyceride or the like constituents; up to about 2 percent by weight of a non-toxic antioxidant component; and up to about 1 percent by weight of a suitable color-stabilizing ingredient. Likewise, if desired, and if absolute clarity is not an essential requirement or vital factor in the resulting coating, minor proportions of various wax constituents may also be incorporated in the compositions. In this connection, certain of the acid-accepting epoxidized long chain fatty acid triglycerides (such as epoxidized soya bean oil) actually have a plasticizing influence and effect upon the ethyl cellulose in the composition. In such cases the epoxy constituent, for purposes of formulation of the present compositions, should be counted as and included within the plasticizer constituent of the formulation.

All of the compositions of the present invention ordinarily form molten mixtures at temperatures that are in excess of the boiling point of water. They may be applied in any desired manner to articles which may be at any temperature beneath that of the hot melt. Advantageously, particularly when fresh meat or meat products are involved, the coating composition may be applied by a method which comprises freezing the article, or at least the surface of the article of food to be coated; and coating the frozen article with the molten composition. Such a method is beneficial in that the surface of the article being coated, particularly meats and the like, is less likely to thus be subjected to discoloring temperatures and vaporization of surface juices.

Brushing, spraying, splashing, and other techniques may be employed in order to apply the beneficial coating compositions of the invention to the articles being coated. It is generally expedient, especially because of the relatively viscous nature of the present compositions and in order to more readily meet the requirements of commercial production, to employ spray or splash coating techniques in order to manufacture the desired coated articles, wherein each of the articles to be coated is passed under or over, or both, one or more non-atomizing sprays of the molten composition or through one or more curtains or sheets thereof, or is otherwise splashed thoroughly therewith, to cover their entire surface in order to effect the desired "pick up" of the coating, after which the applied composition is permitted to cool and harden on the foodstuff. As a matter of fact, the compositions of the present invention are particularly adapted for being applied by machines which coat the hot melt over the foodstuff as a liquid film from nozzles especially constructed and designed for the purpose. Such method of application is especially well suited to provide economically and desirably thin, integral and uniform coatings on a rapid and expedient mass handling and production basis. Application of the hot melt by means of a liquid film or falling curtain effect provides the most advantageous results in these regards. Thus, due to the great viscosity of the present compositions, dip coating may be an unattractive procedure for their application. Furthermore, dip coating oftentimes tends to result in undesirably thick coating layers, especially when viscous formulations are employed and to be a less efficient method of application than machine coating. Atomized spray coating of the hot melts are oftentimes undesirable for the reason that they may causes the coating to be formed with poor integrity and coherence since the atomized hot melts do not seem to be able to fuse together well on the coated article. As a result, the resulting coating may have some porosity and poor strength characteristics.

Coated articles of food, particularly meats, in accordance with the prevent invention, generally have an attractive and pleasing appearance. As a rule, their transparency is sufficiently good and near or at clarity to permit ready visual inspection and evaluation of the foodstuff. As a matter of fact, many of the coatings that may be provided in accordance with the present invention have highly attractive and exceptionally pleasing appearances in this regard, being absolutely transparent, as has been indicated, over a wide temperature range, even at temperatures as low as those in the neighborhood of about −20° F. and lower.

Unlike most of the coatings from many of the conventional hot melt compositions, the coatings of the present invention are not sticky, oily, greasy or otherwise objectionable or uncomfortable to touch or handle. As a matter of fact, the coatings of the present invention generally have a desirable and quite acceptable relatively "dry" feel upon being handled and are not in the slightest objectionable from such viewpoint. Neither do they cause oleaginous deposits of contamination to occur upon the hands of a person or upon other surfaces with which they may come in contact. Of even greater significance, they have a surprisingly minimized tendency to allow oil migration to the surface of the coated article. The coated foodstuffs, particularly meat and the like products, are generally found to be substantially free from oil on their coated surface; having less than 150-200, and frequently less than 25-35 p.p.m. of exuded mineral oil migrated thereon. The coatings which are provided adhere tightly as an exceptionally thin film about the articles and conform closely to their contours, even when bony meats or fowl are involved. They are non-toxic and odorless and do not impart odors or tastes to the food being coated. They are readily peelable, cuttable or strippable in a clean and efficient manner from the article of food. Thus, they do not require resort to washing or other tedious and inconvenient procedures for their complete removal.

As indicated, the coatings are relatively flexible and remain remarkably strong and tough at temperatures as low as about −20° F. so that they resist damage due to handling (including severe scuffing and jostling) and storage of a coated article being maintained in a frozen condition. They also have an extremely low rate of water vapor transmission. Their characteristics in this regard are comparable to those which are found in other distinct varieties of ethyl cellulose type coatings. Thus, the coated articles may be preserved in a better condition and are less susceptible to becoming rancid or dehydrated or to develop "freezer burn," even when stored frozen for periods of a year or longer. Despite their advantageous relative impermeability, however, the coatings of the present invention are adapted to permit passage of sufficient oxygen so that coated fresh meats, for example, can readily retain their desirably fresh and natural color. In addition, the applied coating compositions of the present invention effectively prevent the absorption of undesirable foreign odors and tastes in the food product.

Thus, the coated articles of the present invention, most of which are provided with a clear and transparent cover, permit visual inspection of all sides of the coated foodstuff; they are devoid of air pockets and separations between the food and the coating due to the skin tight character of the latter; they prevent contamination of the coated article from manual inspection; they can withstand "poking" due to the good strength of the film; the coating thereon is flexible at freezer temperatures and will not crack; likewise, the coating has no appreciable tendency to craze; the coated articles, especially meats, do not lose liquids or essential juices; the coating thereon is easily removable from the coated food; they are seamless; they retain the bloom or desirable red color of such foods as meat even under prolonged storage at freezer temperatures; they have good shippability; they can be prepared and employed in a mechanized system; they eliminate requirements for repackaging; they frequently permit the surface of the coated food to be pasteurized due to the high applicating temperature of the coating; and they frequently result in such coated foods as smoked meats and sausages to have a supplemented and improved color, also by virtue of the high application temperature of the applied coating composition.

The ethyl cellulose which may be employed in the practice of the present invention is a commonly available material having ethoxyl content in the range from about 47.5 to about 50 percent by weight. In many cases, it may be desirable to utilize a cellulose ether having an ethoxyl content of from about 48.0 to 49.5 percent by weight. Its viscosity, as determined in a solution of about 5 percent by weight of the ethyl cellulose in a solvent mixture consisting of about 80 parts by volume of toluene and about 20 parts by volume of ethanol, may be from about 6 to about 200 centipoises (cps.). In many cases, it is more convenient and may be of greater expediency and practicality to employ a cellulose ether having a viscosity that is not in excess of about 50 cps. The particular viscosity grade of cellulose ether that is employed as well as the precise formulation of composition that is utilized depends, as has been indicated, upon the manner of application contemplated for the particular composition being used to coat the articles. For example, when a dip application of the coating is intended to be made, the viscosity of the cellulose ether that is employed should not be in excess of about 30 cps., and, even more beneficially, may be in the neighborhood of 6 to 11 cps. In this connection, in order to maintain the desired high viscosity of the hot melt, it is usually necessary in formulations prepared with lower proportions of ethyl cellulose within the indicated ranges to employ a higher viscosity grade of the cellulose ether, such as one in the range of at least about 20-50 cps. Formulations with higher quantities of ethyl cellulose can be prepared with excellent results using lower viscosity grades of the ether, such as the 10-20 cps. or so varieties.

A more desirable formulation of the compositions of the present invention is one composed so as to fall within the lines connecting the points 2-3-5-6-7-8-2 in the graph of Figure 3 of the drawing. A preferred formulation of the compositions in accordance with the present invention is as follows:

*Recipe of preferred low oil exuding hot melt for spray coating*

| | Percent by weight |
|---|---|
| Ethyl cellulose, 20-50 cps. | 22 to 37 |
| Refined mineral oil | 45 to 58 |
| Non-toxic plasticizer | 15 to 25 |
| Epoxidized natural glyceride of unsaturated fatty acids | 0 to 5 |
| Antioxidant | 0 to 1 |
| Color stabilizer | 0 to 0.5 |

As mentioned, the oleaginous constituent that is employed in the compositions of the present invention is a refined mineral oil of a paraffinic variety or an equivalent material derived from a naphthenic petroleum source. It is desirable and ordinarily preferable for light color or water white mineral oils to be employed. Mineral oils having a viscosity in the range from about 80 to about 400 Saybolt units at 100° F. are ordinarily most advantageous to employ.

The plasticizer or plasticizing component which is utilized should be a solvent for the cellulose ether which is compatible with other constituents of the composition. Suitable plasticizers for practice of the present invention include such colorless, odorless and non-toxic materials as those which are ester plasticizers for ethyl cellulose such as alkyl phthalyl alkyl glycolates (specifically methyl phthalyl ethyl glycolate; ethyl phthalyl ethyl glycolate; and butyl phthalyl butyl glycolate); trialkyl esters of acyl citric acid (specifically acetyl tributyl citrate which may be commercially obtained as "Citroflex A-4"); dialkyl adipates (specifically diisobutyl adipate); various acetylated mono- and di-fatty acid glycerides; certain dialkyl phthalates (specifically di-2-ethylhexylphthalate); dialkyl sebacates (specifically dibutyl sebacate and dioctyl sebacate); various fatty acid ester derivatives (including glycerol mono-oleate; glycerol mono-stearate; and n-butyl stearate); alkyl-aryl phosphates (specifically 2-ethylhexyl diphenyl phosphate); castor oil; and the like. It may frequently be beneficial to employ mixtures of various plasticizing materials in the hot melt compositions. The plasticizer acetyl tributyl citrate may be utilized with great advantage for purposes of the invention. Castor oil may also be employed with benefit and such plasticizers as butyl phthalyl butyl glycolate are likewise quite suitable for use.

The epoxidized long chain fatty acid triglycerides that may be employed in the practice of the present invention are useful to inhibit hydrolytic degradation of the ethyl cellulose. Such materials are sometimes referred to as being epoxidized natural glycerides of unsaturated fatty acids. Ordinarily, they are derived from fatty acids that contain between about 12 and 22 carbon atoms. Such acid-accepting epoxy materials may be specifically typified and particularized by such compositions as epoxidized soya bean oil, including the products of this variety which are obtainable as "Paraplex G-60" and "Paraplex G-62," respectively. As has been indicated, certain of these materials, such as epoxidized soya bean oil, are actually plasticizers for ethyl cellulose. When plasticizing materials of this type are employed they should actually be included and calculated as part of the plasticizer component of the composition. In certain cases, as when plasticizing epoxidized soya bean oil is employed, suitable results may be obtained when all of the plasticizer component consists of such ingredient.

Various non-toxic antioxidants are also advantageous to employ in the compositions of the invention in order to inhibit oxidative degradation of the ethyl cellulose and any fatty acid glycerides that may be present therein. Typical of such antioxidants are butylated hydroxy anisol; nordihydroguaiaretic acid; 2,6-ditertiary butyl-4-methyl phenol which is obtainable as "Ionol"; and certain substituted butylated phenols such as those which are commercially available as "Voidox."

It is also beneficial in many instances to incorporate certain non-toxic color stabilizers in the compositions to facilitate the retention of a desirably clear and free from discoloration condition in the coating. Advantageously, the color stabilizers that may be utilized are those which are disclosed in the non-abandoned application for United States Letters Patent of the present applicant Wirt having Serial No. 663,613 which was filed on June 5, 1957. Thus such organic acids as citric acids and tartaric acid may be utilized with great advantage. Other color stabilizers which may be employed include various organic phosphites such as tricresyl phosphite and mixed organic phosphite-epoxy compounds including those that may be obtained commercially as "Advastab CH-49" and "Advastab CH-201."

If desired, any of a variety of paraffin and microcrystalline waxes may be utilized in the practice of the invention, including, advantageously, such materials as paraffin; hydrogenated castor oil (a synthetic wax); ceresin; ozokerite; carnauba wax; and beeswax, all of which melt at temperatures in excess of about 100° F. Ordinarily, up to about 5 percent by weight, based on the weight of the composition, of a wax may be suitably included in the formulation without depriving the resulting coating of sufficiently good transparency and near clarity to permit easy visual inspection and evaluation of a foodstuff enveloped therein. Regardless of the slight effect upon transparency characteristics, the coatings obtained from the compositions prepared with tolerable quantities of the wax ingredients within the indicated limits exhibit good flexibility, even at freezer temperatures, and have a desirably dry feel. Ordinarily, the use of a wax ingredient serves to offer some measure of control for the viscosity characteristics of the resulting hot melt. Thus, incorporation of a wax ingredient in a composition may be particularly advantageous when dip and the like applications are contemplated for the coating wherein excessively viscous hot melts are ordinarily undesirable to employ. When machine spraying or splashing applications are utilized, however, more viscous compositions may generally be suitably handled so that use of the wax ingredient need not be predicated on such considerations.

In preparing the hot melt coating compositions of the present invention, care should be taken to select such relative proportions of the ingredients as will produce a coating having optimum characteristics within the range dictated by its own inherent limitations. In addition, as has been indicated, both the proportions and the nature of the specific ingredients employed should take into account the type of application intended for the composition, particularly with respect to the viscosity of the cellulose ether constituent and the proportion of the oleaginous constituent that may be employed. Thus, with some combinations of ingredients, a larger proportion of the ethyl cellulose or a higher viscosity grade of such constituent may produce a more viscous hot melt than is desirable for particular operating temperatures or particular modes of application whereas smaller proportions, in some instances, may not lend sufficient strength to the film coating. Smaller quantities of the oleaginous constituent may also increase the viscosity of the hot melt. Similarly, greater amounts of the oleaginous constituent may sometimes tend to yield an undesirably oily film coating. In an analogous manner, too much plasticizer may at times produce a film coating which is softer and more oily than might be otherwise obtained, and which is also quite liable to be too tacky and more or less "cheesy" in nature and character. Such coatings often cause great difficulty in blocking of stacked coated articles and may also be quite difficult to strip or peel. The same consequences may result from various combinations of the epoxidized natural glyceride of unsaturated fatty acids (when such constituent is utilized) especially in its combination with the plasticizing ingredient. On the other hand, the use of too small a quantity of the plasticizer may, in certain instances, impart undesirable brittle characteristics to the film coating. Likewise, as has been explained, larger relative proportions of the wax may result in a film coating which tends more to opacity and should be avoided where exceptionally good transparency is a desired quality or factor. A properly formulated composition should permit applied film thicknesses to be obtained by machine spray application techniques that are between about 5 and 100 mils and preferably less than about 50 mils with a single pass of the article to be coated under the falling curtain or film or other non-atomized spray of the hot melt. Of course, as can readily be appreciated generally thicker applied coatings can be obtained, if desired, especially when other coating techniques are utilized for their application. As a matter of fact, it may oftentimes be economically attractive for the thickness of the applied coatings to be in the neighborhood of 10-25 mils or so.

Since the hot melt compositions of the present invention are at relatively high temperatures during their application, it is advantageous to coat many articles while they are in a frozen condition. This minimizes the possibility of causing slight surface discoloration and dehydration of the foodstuff, particularly when meat and meat products are being coated. It also obviates any objections to the coated articles which may arise for such reasons. The discolorations which may occur from coating food articles at normal temperatures are innocuous, however, and bear no relationship to their quality or wholesomeness in any consideration other than appearance. Thus, if it is otherwise suitable, articles which are not in a frozen condition may be satisfactorily coated with the compositions of the present invention. As a matter of fact, there are many instances when no significant advantage may be derived by chilling or freezing the article before coating. This may be the case, for example, when various smoked or cured meats, fish or fowl are being coated. The normal, treated appearance of such foodstuffs is acceptable and does not detract from their marketability, although they actually are discolored from a natural condition.

The invention is further illustrated in and by the following examples wherein, unless otherwise indicated, all parts and percentages are to be taken by weight.

EXAMPLE I

Various cuts of meat, including steaks, chops, and roasts from beef, lamb and pork as well as liver, fish, bacon and several varieties of luncheon meat were coated by first freezing and then spray coating them with a hot melt at about 320° F. which was comprised of about 32 parts of ethyl cellulose of a viscosity grade of about 10 c.p.s. that was obtained under the trade-designation "Ethocel"; about 53 parts of a refined mineral oil having a viscosity between about 95 and 105 Saybolt units at 105° F. which was obtained under the trade-designation "White Oil L-1"; and about 14.86 parts of a plasticizer combination consisting of about 5.0 parts of a refined and deodorized castor oil obtained under the trade-designation "Crystal-O"; 1.5 parts of an acetylated monoglyceride obtained under the trade-designation "Myvacet 9-40"; about 1.36 parts of glycerol mono-oleate obtained under the trade designation "Myverol 18-71"; about 4.0 parts of epoxidized soya bean oil obtained as "Paraplex G-62" (and included in the formulation as part of the plasticizer mixture); and about 0.14 part of citric acid as a color stabilizer.

As indicated, the composition was applied on the various articles of food by passing them through a sheet-like screen or curtain of the hot melt composition that was forced in an enveloping pattern over and upon the articles through ejection nozzles adapted for the purpose. Some of the articles were coated while frozen and others while they were at normal refrigerator temperatures. The applied coatings had average thicknesses between about 10 and 50 mils. After the treatment, the coating was permitted to cool and harden. All of the coated articles, as schematically illustrated in a perspective view in Figure 1 and in cross-section in Figure 2 of the accompanying drawing, had an attractive and pleasing appearance and were not objectionable to the touch, having a highly desirable "dry" feel to the touch. The applied coating adhered tightly to each of the articles and conformed closely to them as a thin enveloping film about their various irregular contours. It was completely transparent, allowing visual inspection of the coated articles which retained their essential natural appearances. The coating was remarkably tough and did not become embrittled at freezing temperatures. It did not rupture upon repeated dropping of the frozen articles or even when the articles were subjected to such purposely abnormal and abusive handling as being repeatedly thrown and skidded over concrete floors. It could be stripped cleanly from the articles without remnants or segments of the coating adhering to the foodstuff. This permitted the articles to be obtained in their normally available condition after being freed of the coating. In addition, the coating provided excellently indefinite protection against "freezer burn" as evidenced by the fact that no appreciable indication of such condition could be observed in coated articles that were maintained in a frozen condition for periods as long as 12 months or more.

Equivalent results are similarly obtainable with poultry, if care is taken to suitably plug or cover the cavities in their dressed carcasses. Various cheeses may also be coated satisfactorily with the above hot melt composition and others in accordance with the invention.

EXAMPLE II

The procedure of Example I was repeated to spray coat various articles of food with the following formulation especially prepared for the intended method of application:

| | Parts |
|---|---|
| Ethyl cellulose, 20 cps. | 25.9 |
| Refined mineral oil, Saybolt viscosity at 100° F. 95/105 units | 60 |
| "Citroflex A-4" | 7 |
| "Crystal-O" | 6 |
| "Paraplex G-62" | 2 |
| Citric acid | 0.1 |

Excellent results were obtained. The coating applied on the articles had properties about equivalent to those of Example I. Excellent results were also obtained with compositions similar to the foregoing when any one or two or the two last-mentioned ingredients were eliminated from the formulation.

Completely satisfactory results may also be achieved when ethyl cellulose of a viscosity grade of 50 cps. or higher is used in compositions similar to the above and that of Example I for machine application.

EXAMPLE III

Pursuant to the foregoing procedure, two machine coating formulations were prepared and data obtained on them as shown in the following tabulation. In all cases, representative cuts of meat having an average weight of about two pounds were coated.

TABLE 1
*Machine coating formulations*

| | Formulation "B" | Formulation "C" |
|---|---|---|
| Ethyl Cellulose, 10 cps., std | 25.89 | 29.87 |
| White Mineral Oil (same as in Example I) | 59.00 | 55.00 |
| "Citroflex A-4" | 6.00 | 6.00 |
| "Crystal O" Castor Oil | 7.00 | 7.00 |
| "Paraplex G-62" | 2.00 | 2.00 |
| Citric Acid | 0.11 | 0.13 |
| Oil/Plasticizer Ratio | 3.93 | 3.67 |
| Oil/Ethyl Cellulose Ratio | 2.28 | 1.84 |
| Ethyl Cellulose/Plasticizer Ratio | 1.73 | 1.99 |
| Physical properties: | | |
| Tensile strength, lbs./in.$^2$ | 96 | 142 |
| Elongation, percent | 45 | 40 |
| Brookfield Viscosity, cps | 330 | 640 |
| Coating thickness, mils | 25 | 25 |

As is apparent (and as is also shown by the data points recorded in Figure 3 of the drawing), Formulation "B," having too high an oil to plasticizer ratio and too low a viscosity, was without the range of the compositions contemplated as being within the scope of the present invention.

In tests with each formulation to determine oil pick-up on both coated frozen beef and pork after 5 hours of thaw at room temperature prior to stripping, Formulation "B" was found to have exuded about 230 p.p.m. of oil on the beef surfaces and 360 p.p.m. of oil on the pork surfaces. Such a degree of migration is unsatisfactory and, as a practical matter, objectionable. Formulation "C," however, exuded only 135 p.p.m. of oil on the beef and 145 p.p.m. of oil on the pork after the 5 hour thaw test. Such performance, as indicated, is entirely acceptable. The 5 hour thaw test, incidentally, represents very severe conditions with respect to oil migration. Usually, frozen coated articles of food are thawed only about half-an-hour or so prior to stripping.

In contrast with the foregoing, a typical dip coating formulation was prepared as follows:

Dip coating formulation "A"

| | Percent |
|---|---|
| Ethyl cellulose, 10 cps., std | 22.9 |
| White mineral oil (same as in Ex. I) | 62.0 |
| "Citroflex A-4" | 6.0 |
| "Crystal O" castor oil | 7.0 |
| "Paraplex G-62" | 2.0 |
| Citric acid | 0.1 |

Physical properties were obtained on the above coating after typical two pound cuts of beef and pork were hand dipped in the melt. The meat was then analyzed for mineral oil pickup. Results are listed in Table 2.

TABLE 2
*Data on dip coating formulation "A"*

| | |
|---|---|
| Tensile strength lbs./in.$^2$ | 70 |
| Elongation percent | 60 |
| Brookfield viscosity cps | 215 |
| Coating thickness mils | 50 |
| Oil pick up on beef—5 hours thaw at R.T. p.p.m. | 331 |
| Oil pick up on pork—5 hours thaw at R.T. p.p.m. | 400 |

As is apparent, the dip coating formulation provided undesirably thick coatings which exhibited excessive oil exudation tendencies. In addition, the coatings from Formula "A" (whose composition is also plotted in the graph of Figure 3) were much oilier and less "dry" feeling to the touch than those from Formula "C."

EXAMPLE IV

Several additional machine coating formulations, one of which ("D"), not strictly in accordance with the present invention, were prepared and coated on meat by machine spraying at hot melt temperatures between about 290 and 330° F. Their compositions (also indicated in Figure 3), as well as data obtained on them, are set forth in the following Table 3. Again, in all cases, representative cuts of meat having an average weight of about two pounds were coated.

TABLE 3
*Machine coating formulations* (d)

|  | "D" | "E" | "F" | "G" | "H" | "I" |
|---|---|---|---|---|---|---|
| "Ethocel," 10 cps., std | 29.84 | 29.85 | 29.85 |  |  |  |
| "Ethocel," 20 cps., std |  |  |  | 29.85 | 25.85 | 23.85 |
| White Mineral Oil (same as Example I) | 55.00 | 51.00 | 48.00 | 51.00 | 55.00 | 57.00 |
| "Citroflex A-4" | 7.00 | 7.00 | 8.00 | 7.00 | 7.00 | 7.00 |
| "Santicizer B-16" c | 5.00 | 10.00 | 12.00 | 10.00 | 10.00 | 10.00 |
| "Paraplex G-62" | 3.00 | 2.00 | 2.00 | 2.00 | 2.00 | 2.00 |
| Citric Acid | 0.14 | 0.14 | 0.14 | 0.14 | 0.14 | 0.14 |
| Butylated Hydroxy Anisole | 0.02 | 0.01 | 0.01 | 0.01 | 0.01 | 0.01 |
| Oil/Plasticizer Ratio | 3.67 | 2.68 | 2.18 | 2.68 | 2.89 | 3.00 |
| Oil/Ethyl Cellulose Ratio | 1.84 | 1.71 | 1.61 | 1.71 | 2.18 | 2.38 |
| Ethyl Cellulose/Plasticizer Ratio | 1.99 | 1.56 | 1.36 | 1.56 | 1.36 | 1.26 |
| Tensile, lbs./in.² | 104 | 41 | 17 | 120 | 55 | 50 |
| Elongation, percent | 60 | 114 | 198 | 96 | 171 | 149 |
| Brookfield Viscosity, cps | 1,135 | 652 | 810 | 1,735 | 1,048 | 599 |
| Coating thickness, mils | 25 | 25 | 25 | 25 | 25 | 25 |
| Excessive crazing a | Yes | No | No | No | No | No |
| Beef—oil pick up—5 hours thaw, p.p.m |  |  |  | 54 |  |  |
| Pork—Oil pick up—5 hours thaw, p.p.m | b 260 | 35 | 30 | 42 | 30 | 90 | a Crazing refers to whitening of coating at −20° F.
b Unsatisfactory, objectionable, not practical.
c Butyl phthalyl butyl glycolate.
d All ingredients in percent of total composition.

All of the coated articles, excepting those from Formulation "D," had characteristics at least as good as those set forth in the first example with the resulting coatings, in general, having a desirably "dry" feel.

Similar results are obtained when the above Formulations "E" through "I" are duplicated excepting to employ 2,6-ditertiary butyl-4-methyl phenol ("Ionol") or 2,2-thiobis(4-methyl-6-tert. butyl phenol) ("Santonox") or the like as the antioxidant in place of or in combination with the butylated hydroxy anisole.

Good results are also obtained when the compositions of the present invention, such as Formulations "G" and "H," are prepared and employed as indicated with the addition thereto of about 2 percent of a paraffin wax having a melting point of about 135° F. The coatings thereby obtained are quite tough and not brittle at freezing temperatures. They are nearly completely transparent and permit the coated articles to be visually inspected. The wax-containing coating can also be stripped cleanly from the articles so as to readily allow the articles to be obtained in their normally available condition after being freed of the coating. As in the foregoing examples, the wax-containing coating also provides excellent protection for the articles when they are kept frozen for long periods of time.

Similar excellent results may also be obtained when the paraffin wax ingredient is substituted with hydrogenated castor oil, carnauba wax or beeswax.

In contrast, hot melt formulations prepared with compositions falling without the scope of the invention, such as those with formulations outside those defined by the lines connecting points 1–4–5–6–7–9–1 in Figure 3 of the drawing, generally provided results inferior to those obtainable with the presently contemplated compositions, primarily due to tendencies to exude excessive quantities of oil on the coated foodstuff; and also because of inferior physical properties, poorer coatability or strippability, or for other of the reasons indicated in the graph.

It is to be fully understood that the scope and purview of the present invention is to be construed from the following claims rather than strictly from the foregoing docent specification and description.

What is claimed is:

1. Coating composition for articles of food having minimum propensity to exude oil, which consists of a mixture, adapted to be applied as a hot melt having a viscosity at 320° F. between about 500 and 10,000 centipoises, of an ethyl cellulose having an ethoxyl content between about 47.5 and 50 percent by weight and a viscosity between about 6 and 200 cps., as determined in a 5 percent by weight solution thereof in an 80:20 mixture, by volume, of toluene and ethanol; a refined mineral oil having a Saybolt viscosity at 100° F. between about 80 and 400 units; and a colorless, odorless, non-toxic plasticizer component which is a solvent for the cellulose ether, said composition being constituted essentially of between about 20 and about 38 weight percent of said ethyl cellulose, between about 42 and about 61 weight percent of said refined mineral oil, between about 14 and about 28 weight percent of said non-toxic plasticizer and being further characterized, within the specified limits, in having an ethyl cellulose to plasticizer weight ratio between about 1.25:1 and about 2.0:1, respectively, a mineral oil to ethyl cellulose weight ratio between about 1.2:1 and about 2.7:1, respectively, and a mineral oil to plasticizer weight ratio between about 1.8:1 and 3.9:1, respectively.

2. A composition according to the composition set forth in claim 1 having a hot melt viscosity at 320° F. between about 600 and 5000 centipoises and containing from about 22 to 37 percent by weight, based on the weight of the composition, of said cellulose ether; from about 45 to 58 percent by weight, based on the weight of the composition, of said refined mineral oil; and from 15 to 25 percent by weight, based on the weight of the composition, of said plasticizer component.

3. The composition of claim 1, wherein the plasticizer component is butyl phthalyl butyl glycolate.

4. Process for coating articles of food which comprises the steps of (1) applying to the article, while it is being maintained at a relatively lower temperature, a thin enveloping film of a coating from a composition in molten form having a viscosity at 320° F. between about 500 and 10,000 centipoises, said composition comprising essentially (a) an ethyl cellulose having an ethoxyl content between about 47.5 and 50 percent by weight and a viscosity between about 6 and 200 centipoises, as determined in a 5 percent by weight solution thereof in an 80:20 mixture, by volume, of toluene and ethanol; (b) a refined mineral oil having a Saybolt viscosity at 100° F. between about 80 and 400 units; and (c) a colorless, odorless, non-toxic plasticizer component which is a solvent for the cellulose ether, said composition being constituted essentially of between about 20 and about 38 weight percent of said ethyl cellulose, between about 42 and about 61 weight percent of said refined mineral oil, between about 14 and about 28 weight percent of said non-toxic plasticizer and being further characterized, within the specified limits, in having an ethyl cellulose to plasticizer weight ratio between about 1.25:1 and about 2.0:1, respectively, a mineral oil to ethyl cellulose weight ratio between about 1.2:1 and about 2.7:1, respectively, and a mineral oil to plasticizer weight ratio between about 1.8:1 and 3.9:1, respectively; and (2) cooling the applied coating on the article to a hardened condition.

5. The process of claim 4, wherein said composition is applied to said article by spray coating said composition thereover; and wherein said composition has a viscosity at 320° F. of from about 600 to 5,000 centipoises and is comprised of from about 22 to 37 percent by weight, based on the weight of the composition, of said ethyl cellulose; from about 45 to 58 percent by weight, based on the weight of the composition, of said refined mineral oil; and from about 15 to 25 percent by weight, based on the weight of the composition, of said non-toxic plasticizer component.

6. The process of claim 5, wherein said article of food is in a frozen condition during the application of said composition.

7. An article of food having a thin, tightly-adhering and readily peelable coating which is comprised of a composition in accordance wtih the composition set forth in claim 1 and which is further characterized in having not more than about 200 parts per million by weight, based on the weight of the coated article, of mineral oil residue on the surface of each two pound portion of said article exuded thereon from said coating.

8. The coated meat product according to claim 7, characterized in having less than about 25–35 parts per million by weight of oil residue on the surface of each two pound cut of said meat.

References Cited in the file of this patent

UNITED STATES PATENTS

| | | |
|---|---|---|
| 2,551,463 | Ramsbottom | May 1, 1951 |
| 2,558,042 | Cornwell | June 26, 1951 |
| 2,577,211 | Scharf | Dec. 4, 1951 |
| 2,682,475 | Smith | June 29, 1954 |
| 2,840,474 | Wirt et al. | June 24, 1958 |